United States Patent Office 3,794,633
Patented Feb. 26, 1974

3,794,633
PROCESS FOR THE MANUFACTURE OF PEPTIDES CONTAINING CYSTINE
Bruno Kamber and Werner Rittel, Basel, Switzerland, assignors to Ciba-Geigy Corporation, Ardsley, NY.
No Drawing. Filed Dec. 9, 1970, Ser. No. 96,556
Claims priority, application Switzerland, Dec. 16, 1969, 18,668/69
Int. Cl. C07c 103/52; C07g 7/00; C08h 1/00
U.S. Cl. 260—112.5                                12 Claims

ABSTRACT OF THE DISCLOSURE

The invention concerns an improved process for the manufacture of cystine-containing peptides from cysteine-containing aminoacid sequences whose mercapto groups are protected by a group of the formula

—$CH_2$—NH—CO—R, in which CO—R represents the acyl radical of a carboxylic acid, wherein the S-protected cysteine-containing sequences are directly oxidized with iodine to yield the cystine disulfide bond.

---

The Belgian Pat. No. 732,851, describes a process for the manufacture of peptides containing cystine, in which starting from aminoacid sequences containing cysteine and having trityl-protected mercapto groups, the corresponding peptides containing cystine are obtained directly by treatment with iodine without prior removal of the protective groups.

It has now surprisingly been found that this direct oxidation with iodine also occurs if the mercapto groups are not protected by the trityl group but by the recently described acetylaminomethyl group (Tetrahedron Letters No. 26, pages 3057–58, 1968). Instead of the acetyl residue, a different acyl residue can also be present in the protective group; this acyl residue can be generally described as a residue of a carboxylic acid of Formula I

—CO—R wherein R represents an optionally substituted aliphatic, cycloaliphatic, cycloaliphatic-aliphatic, aromatic, araliphatic, heterocyclic or heterocyclic-aliphatic residue. R is primarily an optionally substituted lower alkyl residue, for example a methyl, ethyl, propyl, isopropyl, n-butyl or tert. butyl residue, which can for example contain halogen atoms such as fluorine, chlorine, bromine or iodine, trifluoromethyl or the nitro group, as substituents. Further, R is for example an optionally substituted cycloalkyl residue with 3–8, preferably 5–6, ring atoms such as the cyclopentyl or cyclohexyl residue or an optionally substituted aromatic or araliphatic residue, wherein the aromatic ring is preferably the benzene ring, above all optionally substituted phenyl and benzyl, for example unsubstituted phenyl or benzyl, or phenyl or benzyl substituted in the phenyl residue by lower alkyl, lower alkoxy, halogen or nitro or an optionally substituted, preferably monocyclic, heterocyclic residue unsubstituted or substituted as mentioned, for example a thienyl or furyl residue.

The new process for the manufacture of peptides containing cystine, and their derivatives, from aminoacid sequences containing cysteine, in which the mercapto groups are protected by a protective group of formula

—$CH_2$—NH—CO—R, wherein CO—R denotes the acyl residue of a carboxylic acid, is characterized in that the aminoacid sequence or sequences containing the cysteine residues which are to be bonded are treated with iodine. The reaction takes place at room temperature but can, depending on the nature of the peptide, also be carried out at lower or higher temperature, for example at temperature of 0 to 60° C. The reaction is preferably carried out in a solvent in which iodine and the peptide are at least partially soluble, preferably in an alcohol such as a lower alkanol, for example ethanol, or especially methanol, or in a mixture of an alcohol with an organic solvent, in which the peptide is soluble, such as ethyl acetate, dimethylformamide, methylene chloride or in acetic acid, for example glacial acetic acid or aqueous acetic acid. Appropriately, a constant excess of iodine is provided, for example by working in dilute solutions and adding the peptide solution to the iodine solution. This results in exclusively the desired monomer being obtained. If on the other hand the converse procedure is followed, for example the iodine solution added dropwise to a peptide solution, considerable amounts of polymer are formed. The excess iodine can for example be removed from the resulting solution with thiosulphate.

If the process is to be used for the manufacture of cystine-peptides which, to permit further synthesis at the amino group, carry protective groups that are easily split off by acids such, for example, as trityl or 2-(p-biphenylyl)-2-propyloxycarbonyl (compare French Pat. No. 1,554,-051), or equivalent groups, the process is advantageously carried out in the presence of acid acceptors or buffers. Acid acceptors that may be used are, for example (especially if the reaction is carried out in aqueous solution) weak alkalies, for example, sodium carbonate or sodium bicarbonate or, chiefly in organic solution, organic nitrogen bases such as primary, secondary or tertiary amines, for example appropriate lower alkyl- or cycloalkylamines, aromatic, araliphatic or heterocyclic amines, for example sec. butylamine, morpholine, thiomorpholine, pyrrolidine, piperidine, aniline, toluidine, benzylamine, triethylamine, Hünig base, quinoline, preferably pyridine. As buffers may be mentioned those with a pH range of 4.5 to 9, preferably 5–8, for example, alkali metal salts of weak acids such as acetate buffer, citrate buffer, phosphate buffer. In the synthesis of peptides containing cystine with the use of protective groups that can be split off by acids, the α-amino group, for example, can be protected by the trityl or 2-(p-biphenylyl)-2-propyloxycarbonyl group and the side chain amino groups can be protected by the tert.butoxycarbonyl group and, further, hydroxyl groups can for example be protected by the tert.butyl ether group and carboxyl groups by the tert.butyl ester group. On oxidation to give the cystine, the $N^\alpha$-trityl or 2-(p-biphenylyl)-2-propoxycarbonyl group is then not attacked. These $N^\alpha$-groups can subsequently to the oxidation be split off selectively relative to the remaining protective groups by means of an acid, for example with 80% strength acetic acid, and the resulting protected peptide with a free α-amino group can be used for the further condensation.

In the process according to the invention, peptides in which the amino groups are free or protected are used as starting substances. Free hydroxyl and carboxyl groups can also, if desired, be present in a protected form. As amino protective groups there should, for example, be mentioned: trifluoracetyl, phthaloyl, p-toluenesulphonyl, or above all groups derived from carbonic acid such as carbobenzoxy groups which are optionally substituted in the aromatic residue by halogen atoms, or lower alkyl, lower alkoxy or lower carbalkoxy groups, tolyloxycarbonyl, 2-phenyl-isopropoxycarbonyl, 2 - tolyl-iso-propoxycarbonyl and above all 2-p-diphenylisopropoxycarbonyl (under the abovementioned conditions) and also aliphatic oxycarbonyl groups, such as for example cyclopentyloxycarbonyl, tert. amyloxycarbonyl, adamantyloxycarbonyl and primarily tert. butoxycarbonyl.

The carboxyl groups can, if desired, for example be protected by amidation or esterification. As esters, those of methanol, ethanol, benzyl alcohol, p-methoxybenzyl alcohol, 2,4,5-trichlorophenol, N-hydroxysuccinimide, N-hydroxyphthalimide or above all of tert. butanol should for example be mentioned. Hydroxyl groups, for example of serine or tyrosine residues, can for example be protected by etherification, for example with benzyl alcohol or preferably with tert. butanol. In arginine residues, the guanidino group can for example be protected by the tosyl group. The disulphide-peptides obtained in the present process and possessing protective groups can be directly used for the synthesis of peptides with a longer aminoacid chain or, if desired, the protective groups can be split off in a known manner by hydrolysis and/or reduction.

The peptides containing cystine, and their derivatives, which are used as starting substances are known or can be manufactured according to methods which are in themselves known. By derivatives there are especially to be understood peptides in which functional groups, such as for example amino groups, carboxyl groups or hydroxyl groups are provided with the protective groups mentioned or other protective groups known for peptide synthesis, and also compounds which instead of one or both of the cysteine residues to be bonded contain desamino-cysteine residues.

The process according to the invention can be used in the synthesis of any desired peptides or peptide sequences containing cystine, for example for the manufacture of peptides in which the disulphide bridge of the cystine bonds linear aminoacid chains with one another, as is for example the case in oxidized glutathione, or above all for the manufacture of peptides in which the disulphide bridge is in a ring, as for example in the case of oxytocin, the vasopressins, vasotocin, isotocin, the synthetic calcitonins and synthetic anologues of these peptides. If the peptide to be synthesized contains more than one disulphide bridge, either between linear amino chains or in a ring, as for example in the case of insulin, proinsulin, growth hormones, prolactins or apamine then appropriately individual aminoacid sequences which each only contain one disulphide bridge are first manufactured according to the process of the invention, and then these sequences are bonded to one another.

The invention is described in the examples which follow.

The following abbreviations are used:
BOC=tert.butoxycarbonyl
But=tert.butyl
Acm=acetylaminomethyl
Bcm=benzoylaminomethyl
Trt=trityl
Me=methyl

EXAMPLE 1

[BOC—Cys—Asn—OtBu]₂

A solution of 463 mg. of BOC—Cys(Acm)—Asn—OtBu in 5 ml. of methanol is added to 500 mg. of iodine in 5 ml. of methanol and the mixture left to stand for 1 hour at 20° C. Excess iodine is then removed at 0° C. by dropwise addition of aqueous 1 N thiosulphate solution an the product is precipitated by adding water. The dried precipitate is recrystallized from methanol. Crystals of melting point 194–196° C. are obtained.

The starting material BOC—Cys(Acm)—Asn—OtBu can be manufactured as follows:

585 mg. of BOC—Cys(Acm)—OH and 377 mg. of H—Asn—OtBu in 10 ml of ethyl acetate and 5 ml. of dimethylformamide are mixed at 0° C. with 452 mg. of dicyclohexylcarbodiimide and allowed to react for 24 hours at this temperature. The mixture is filtered off, the filtrate is evaporated to dryness, the residue is taken up in ethyl acetate and the solution is washed with 1 N citric acid, 1 N sodium bicarbonate and water. The organic phase is dried with sodium sulphate and evaporated. Crystallization from ethyl acetate and n-hexane yields BOC—Cys(Acm)—Asn—OtBu of melting point 97–100° C.

EXAMPLE 2

(a)  BOC—Cys-Asn-OH
     |
     Trt-Cys-Gly-Glu(OtBu)₂

1.18 g. of BOC—Cys(Acm)—Asn—OtBu and 1.83 g. of Trt—Cys(Acm)—Gly—Glu(OtBu)₂ in 30 ml. of methanol are added to a stirred mixture of 3.2 g. of iodine and 1.38 g. of pyridine in 75 ml. of methanol. After 2 hours at 20° C. the excess iodine is removed with 1 N thiosulphate solution, and the mixture is concentrated to about 20 ml. and poured into 200 ml. of ice water. The product is filtered off and dried over sodium hydroxide. The unsymmetrical cystine derivative is isolated from this product by counter-current distribution in the system chloroform-carbon tetrachloride-methanol-0.1 N ammonium acetate (1:8:5:1). After 500 distribution steps the product is present in elements 50–75 (K=approx. 0.15).

(b)  BOC—Cys-Asn-OtBu
     |
     H—Cys-Gly-Gly(OtBu)₂

1.05 g. of

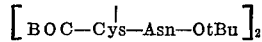

are taken up in 8 ml. of glacial acetic acid and mixed with 2 ml. of water. After 1 hour at room temperature, 6 ml. of water are added, the tritylcarbinol which has separated out is filtered off, and the filtrate is evaporated at 30° C. and 0.01 mm. Hg. The residue is taken up in ethyl acetate and the solution is washed at 0° C. with 0.5 N sodium bicarbonate solution and water, dried over sodium sulphate and evaporated. R_f in chloroform-methanol (8:2)=0.50.

(c)  BOC—Cys—Asn—OtBu—
     |
     BOC—Leu—Val—Cys—gly—Glu(OtBu)₂

1.34 g. of BOC—Leu—Val—OH and 3.24 g. of

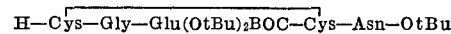

in 50 ml. of dimethylformamide are mixed at 0° C. with 920 mg. of N-hydroxysuccinimide and 1.24 g. of dicyclohexylcarbodiimide. After 15 hours at 0° C. the mixture is filtered off and the filtrate is evaporated. The compound is obtained in a pure form from the residue by reprecipitation from ethyl acetate-hexane. R_f in toluene-acetone (1:1)=0.37; R_f in chloroform-methanol (9:1)=0.46. $[a]_D^{20}=-67°$ C. (c.=1.8 in methanol).

The starting substances can be manufactured as follows:

(1)  Trt—Cys—(Acm)—OH 4.2 g. of trityl chloride in 20 ml. of dimethylformamide are added to a solution of 2.3 g. of H—Cys(Acm)—OH and 2.8 ml. of triethylamine in 50 ml. of dimethylformamide and the mixture is stirred for 24 hours at room temperature. It is then concentrated to about 10 ml., taken up in 100 ml. of ethyl acetate and 50 ml. of water, and adjusted to pH 3 with 1 N citric acid. The ethyl acetate phase is washed with water, dried over sodium sulphate and evaporated. Crystallization from chloroform-petroleum ether yields Trt—Cys(Acm)—OH of melting point 143–145° C.

(2)  Trt—Cys(Acm)—Gly—Glu(OtBu)₂

454 mg. of dicyclohexylcarbodiimide are added at 0° C. to 870 mg. of Trt—Cys(Asm)—OH and 630 mg. of H—Gly—Glu(OtBu)₂ in 20 ml. of ethyl acetate at 0° C. and allowed to react for 48 hours at 0° C. The dicyclohexylurea which has separated out is filtered off and the ethyl acetate solution is washed with 1 N citric acid, 1 N sodium carbonate solution and water. Evaporation of the solution and reprecipitation from ethyl acetate-petroleum ether yields the product in a form which is pure according to a thin layer chromatogram. $R_f$ in chloroform-methanol (9:1)=0.42.

(3) BOC—Leu—Val—OMe 21.9 g. of BOC—Leu—OH and 13.2 ml. of triethylamine in 300 ml. of acetonitrile are mixed at −10° C. with 12.6 ml. of isobutyl chlorocarbonate. After 15 minutes, 15.9 g. of HCl. H—Val—OCH₃ and 13.2 ml. of triethylamine in 160 ml. of acetonitrile are added in such a way that the temperature never exceeds −10° C. After 1 hour at −10° C. and 15 hours at 20° C. the mixture is filtered off, the filtrate is evaporated, the residue is taken up in ethyl acetate and the solution is washed with 1 N citric acid, 1 N sodium bicarbonate and water, and concentrated. On addition of petroleum ether, the product crystallizes out. Melting point 143–144° C. $[\alpha]_D^{20}$ =−44° C. (c.=2.4 in methanol).

(4) BOC—Leu—Val—OH 24 ml. of 2 N sodium hydroxide solution are added to 13.8 g. of BOC—Leu—Val—OCH₃ in 260 ml. of dioxane-water (3:1) and the mixture is left to stand for 1 hour at 20° C. The solution is then concentrated to about 100 ml., 400 ml. of ethyl acetate are added and the mixture adjusted to pH 2.5 with 2 N hydrochloric acid at 0° C. The ethyl acetate solution is washed with water and evaporated. Recrystallization from benzene-hexane yields crystals of melting point 109–111° C. $[\alpha]_D^{20}$=−32° C. (c.=2.0 in methanol).

(5) Z—Gly—Glu(OtBu)₂

14.97 ml. (0.11 mol) of isobutyl chlorocarbonate are added at −10° C. to a solution of 23.2 g. (0.11 mols) of Z—Gly—OH and 15.54 ml. (0.11 mols) of trimethylamine in 200 ml. of tetrahydrofuran, and the mixture is allowed to stand for 10 minutes at −10° C. A mixture of 28.52 g. (96.5 mMols) of H—Glu(OtBu)₂. HCl and 13.5 ml. (96.5 mMols) of triethylamine hydrochloride in 300 ml. of tetrahydrofuran is freed of triethylamine hydrochloride by filtration, and the filtrate is cooled to −10° C. and then added dropwise at −10° C. to the above solution. The mixture is stirred for a further hour at −10° C. and for 2 hours at room temperature, triethylamine hydrochloride which has separated out is filtered off and the filtrate is evaporated to dryness. The resulting oil is taken up in ethyl acetate and washed with 1 N citric acid, 1 N sodium bicarbonate and water. After evaporation of the ethyl acetate the peptide derivative is obtained, which crystallizes from ethyl acetate-n-hexane. Melting point 74–76° C.; $[\alpha]_D^{23}$=−17° C. (c.=2.2 in methanol). In a thin layer chromatogram on silica gel the $R_f$-value in toluene-acetone (7:3)=0.50.

(6) H—Gly—Glu(OtBu)₂

2.7 g. (6 mMols) of Z—Gly—Glu(OtBu)₂ are hydrogenated in 30 ml. of ethyl acetate in the presence of 250 mg. of Pd-charcoal (10%). After 4 hours the hydrogen uptake has ended. The catalyst is filtered off and the solution is evaporated. The product is obtained as an oil which is homogenous according to a thin layer chromatogram. The $R_f$-values (on silica gel) are as follows: in toluene-acetone (7:3)=0.27; in chloroform-methanol (9:1)=0.37; $R_{f43A}$=0.50.

EXAMPLE 3

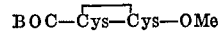
BOC—Cys—Cys—OMe 9.28 g. of BOC—Cys(Acm)—Cys(Acm)—OMe in 500 ml. of methanol is added dropwise, with stirring, at 20° C. and within 45 minutes to 14.7 g. of iodine in 500 ml. of methanol. The mixture is left to stand for 1 hour at ambient temperature, cooled to 0° C. and decolorized with N sodium thiosulphate. The reaction solution is concentrated to approx. 100 ml. in a rotary evaporator and the product then precipitated with water, dried over potassium hydroxide and recrystallized from chloroform-petroleum ether. The product melts at 180–183° C. (with decomposition).

The starting material can be manufactured as follows:

(1) H—Cys(Acm)—OMe, HCl 7.9 ml. of thionyl chloride is added dropwise, with stirring, at −10° C. to 100 ml. of methanol in such a manner that the temperature never rises above −5° C. After completion of addition, 22.8 g. of H—Cys(Acm)—OH is added in the dry state at −5° C. and the batch left to stand 30 minutes at −5° C. and 4 hours at 45° C. The solution is then evaporated in a rotary evaporator. The residue is dried over potassium hydroxide at 0.01 mm. Hg to constant weight. In a thin layer chromatogram on silica gel, $R_f$ in methanol=0.55.

(2) BOC—Cys(Acm)—Cys(Acm)—OMe

To 29.2 g. of BOC—Cys(Acm)—OH, 26.2 g. of H—Cys(Acm)—OMe, HCl and 13.9 of triethylamine in 200 ml. of acetonitrile are given at 0° C. 22.6 g. of dicyclohexylcarbodiimide. After 15 hours the mixture is filtered, the filtrate evaporated, the residue taken up in chloroform and this solution washed with 0.5 N citric acid, 0.5 N sodium bicarbonate and water. On evaporation of the chloroform, the product is obtained as a white residue, which is crystallized from ethyl acetate-petroleum ether; M.P. 81–82° C.

EXAMPLE 4

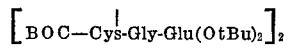

To 1.18 g. of BOC—Cys(Acm)-Gly—Glu(OtBu)₂ in 15 ml. of 80% strength acetic acid 760 mg. of iodine is added in the dry state. The reaction mixture is stirred for 1 hour at 20° C. and decolorized with the thiosulphate solution. The reaction product is precipitated with water and dried over potassium hydroxide. Crystallization from ethyl acetate-petroleum ether yields the

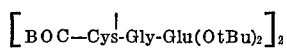

which melts at 150–152° C.

The starting material can be prepared as follows:

To 1.178 g. of BOC—Cys(Acm)—OH and 1.26 g. of H—Gly—Glu(OtBu)₂ in 40 ml. of ethyl acetate are added 900 mg. of dicyclohexylcarbodiimide. The batch is left at 0° C. for 2 hours and at 20° C. for 15 hours, then filtered, the filtrate washed with diluted citric acid, diluted bicarbonate solution and water, dried over sodium sulphate and evaporated. The residue is purified by reprecipitation from ethyl acetate-petroleum ether.

In a thin layer chromatogram on silica gel in the system chloroform-methanol (8:2), $R_f$=0.45.

EXAMPLE 5

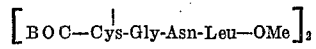

500 mg. of iodine is added to 1.30 g. of BOC—Cys-(Bcm)-Gly-Asn-Leu—OMe in 15 ml. of chloroform-methanol (1:1) and the mixture left to stand for 1 hour at 20° C. The reaction mixture is then diluted with 100 ml. of chloroform and washed with diluted sodium thiosulphate solution and water. The chloroform is evaporated and the residue,

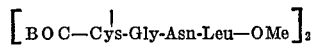

purified by reprecipitation from chloroform-ether.

In a thin layer chromatogram on silica gel in the system n-butanol-glacial acetic acid-water (75:7.5:21), $R_f=0.55$.

The starting material can be manufactured as follows:

(1) H—Cys(Bcm)—OH, HCl

To 15 g. of benzamido-methanol and 12 g. of H—Cys—OH in 100 ml. of water 12 ml. of concentrated hydrochloric acid is added and the reaction mixture stirred for 15 hours at 50° C. After cooling to 0° C., the pH of the solution is adjusted to 4.0 wtih 5 N NaOH, and the solution subsequently evaporated to an oil at 40° C. and 0.01 mm. Hg. The residue is reprecipitated from methanol-ether.

In a thin layer chromatogram on silica gel in methanol, $R_f=0.40$.

(2) BOC—Cys(Bcm)—OH 25.4 g. of H—Cys(Bcm)—OH, HCl is dissolved in 800 ml. of dimethylformamide and 41.6 ml. of triethylamine and 40 ml. of t-butyloxycarbonylazide are added. The reaction mixture is thereafter stirred for 20 hours at 45° C. and then evaporated at 40° C. and 0.01 mm. Hg. The residue is dissolved in ethyl acetate and washed with diluted citric acid and water. The solution is subsequently concentrated and the product precipitated by addition of ether.

In a thin layer chromatogram on silica gel in chloroform-methanol (1:1), $R_f=0.60$.

(3) BOC—Cys(Bcm)-Gly-Asn-Leu—OMe 4.5 g. of H—Gly—Asn—Leu—OMe (Helv. Chim. Acta 53, 556 (1970)) and 3.54 g. of BOC—Cys(Bcm)—OH are dissolved in 100 ml. of dimethylformamide and mixed at 0° C. with 2.28 g. of dicyclohexylcarbodiimide. After 2 hours at 0° C. and 15 hours at 20° C. the mixture is filtered, the filtrate evaporated at 40° C. and 0.01 mm. Hg and the BOC—Cys(Bcm)—Gly—Asn—Leu—OMe precipitated from methanol. On silica gel in chloroform-methanol (8:2), $R_f=0.35$.

EXAMPLE 6

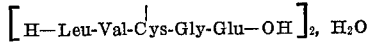

To 312 mg. of H—Leu-Val-Cys(Acm)-Gly-Glu—OH in 8 ml. of 60% strength acetic acid is added 5 ml. of 0.1 N iodine-glacial acetic acid solution with stirring at 20° C. After 30 minutes, the reaction mixture is concentrated at 0.01 mm. Hg, the residue dissolved in water and filtered through a column of a weakly basic ion exchanger (Merck No. II, acetate form). By lyophilization of the eluate, the

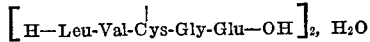

is obtained in the form of a white powder.

In a thin layer chromatogram on cellulose in the system n-butanol-pyridine-glacial acetic acid-water (34:24:12:30), $R_f=0.65$.

The starting material can be manufactured as follows:

(1) H—Cys(Acm)-Gly—Gln(OtBu)$_2$ 1.5 g. of Trt—Cys(Acm)-Gly—Glu(OtBu)$_2$ is dissolved in 16 ml. of glacial acetic acid and 4 ml. of water added. After 1 hour, 12 ml. of water is added at 20° C., the mixture filtered and the filtrate evaporated. The residue is dissolved in ethyl acetate and the solution washed with diluted sodium bicarbonate solution and water. The above product is obtained on evaporation of the solution. In a thin layer chromatogram on silica gel in toluene-acetone (1:1), the product shows an $R_f$ value of 0.45.

(2) BOC—Leu—Val—Cys(Acm)—
Gly—Glu(OtBu)$_2$ 6.7 g. of BOC—Leu—Val—OH and 10.1 g. of H—Cys(Acm)—Gly—Glu(OtBu)$_2$ are dissolved in 250 ml. of dimethylformamide and 4.6 g. of N-hydroxysuccinimide and 6.2 g. of dicyclohexylcarbodiimide are added in the dry state. After 15 hours, the mixture is filtered, the filtrate evaporated in vacuo and the residue purified by reprecipitation from chloroform-petroleum ether.

The BOC—Leu—Val—Cys(Acm)—Gly—Glu(OtBu)$_2$ shows in a thin layer chromatogram on silica gel in the system chloroform-methanol (95:5) an $R_f$ value of 0.26.

(3) H—Leu—Val—Cys(Acm)—
Gly—Glu—OH, CH$_3$COOH 820 mg. of BOC—Leu—Val—Cys(Acm)—Gly—Glu(OtBu)$_2$ is covered at 0° C. with 10 ml. of trifluoroacetic acid. After 45 minutes, the H—Leu—Val—Cys(Acm)—Gly—Glu—OH trifluoroacetate is precipitated by addition of ether and dried over potassium hydroxide. In order to remove the trifluoracetic acid the product is dissolved in water and filtered through a column of a weakly basic ion exchanger (Merck No. II, acetate form). The above product is obtained in pure form by evaporation of the eluate.

We claim:

1. Process for the manufacture of cystine-containing peptides and derivatives thereof from corresponding cysteine-containing aminoacid sequences in which the mercapto groups are protected by a protective group of the formula —CH$_2$—NH—CO—R, wherein CO—R represents the acyl residue of a carboxylic acid, wherein the aminoacid sequence(s) containing the cysteine radicals to be combined is(are) treated with iodine in a solvent in which both iodine and the peptide are at least partially soluble.

2. Process according to claim 1, wherein the reaction is performed in methanol.

3. Process according to claim 1, wherein the reaction is performed in acetic acid.

4. Process according to claim 1, wherein the reaction is performed in a mixture of lower alkanol and another organic solvent.

5. Process according to claim 1, wherein the reaction is carried out in the presence of an acid acceptor or a buffer.

6. Process according to claim 1, wherein the mercapto groups are protected by the acetylaminomethyl residue.

7. Process according to claim 1, wherein the starting material is a cysteine-containing aminoacid sequence which contains both cysteine radicals so that a cyclic peptide is formed by means of the disulfide bridge.

8. Process according to claim 1, wherein the starting material is a cysteine-containing aminoacid sequence in which one or more disulphide bonds are present in addition to the two cysteine residues to be closed to the disulphide bridge.

9. Process according to claim 1, wherein the starting substance is an aminoacid sequence which contains only one cysteine residue, so that a symmetrical cysteine peptide is formed.

10. Process according to claim 1, wherein two different aminoacid sequences are used as starting material each containing one cysteine radical, so that two different aminoacid sequences linked by a disulfide bridge are formed.

11. Process according to claim 1, wherein the reaction is performed in a lower alkanol.

12. Process according to claim 1, wherein the reaction is performed in glacial acetic acid.

References Cited

UNITED STATES PATENTS

| | | | |
|---|---|---|---|
| 3,560,521 | 2/1971 | Milkowski et al. | 260—112.5 |
| 3,679,655 | 7/1972 | Jager et al. | 260—112.5 |

FOREIGN PATENTS

| | | | |
|---|---|---|---|
| 592,631 | 9/1947 | Great Britain | 260—534 S |

OTHER REFERENCES

Veber et al.: Tet. Lett., 3057 (1968).
Kamber et al.: Helv. Chim. Acta. 51, 2061 (1968). Fasc. 8 published Dec. 10, 1968.
Hiskey et al.: J. Am. Chem. Soc. 90, 2677 (1968).
Zervas et al.: J. Am. Chem. Soc., 87, 4922 (1965).
Marinier et al.: Can. J. Chem., 47, 4507 (1969), No. 23 published Dec. 1, 1969.

LEWIS GOTTS, Primary Examiner

R. J. SUYAT, Assistant Examiner

U.S. Cl. X.R.

260—534 S

PO-1050
(5/69)

6914/1+2

UNITED STATES PATENT OFFICE
CERTIFICATE OF CORRECTION

Patent No. 3,794,633        Dated February 26, 1974

Inventor(s) Bruno Kamber et al

It is certified that error appears in the above-identified patent and that said Letters Patent are hereby corrected as shown below:

Column 8, line 67, after "symmetrical", "cysteine" should be --- cystine ---.

Signed and sealed this 17th day of September 1974.

(SEAL)
Attest:

McCOY M. GIBSON JR.
Attesting Officer

C. MARSHALL DANN
Commissioner of Patents aaa